US008738349B2

(12) United States Patent  (10) Patent No.: US 8,738,349 B2
Bertacco et al.  (45) Date of Patent: May 27, 2014

(54) GATE-LEVEL LOGIC SIMULATOR USING MULTIPLE PROCESSOR ARCHITECTURES

(75) Inventors: Valeria Bertacco, Ann Arbor, MI (US); Debapriya Chatterjee, Ann Arbor, MI (US); Andrew Deorio, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 940 days.

(21) Appl. No.: 12/764,942

(22) Filed: Apr. 21, 2010

(65) Prior Publication Data

US 2011/0257955 A1    Oct. 20, 2011

Related U.S. Application Data

(60) Provisional application No. 61/326,212, filed on Apr. 20, 2010.

(51) Int. Cl.
  *G06F 17/50* (2006.01)
(52) U.S. Cl.
  CPC .................................. *G06F 17/5022* (2013.01)
  USPC ............................................................ 703/15
(58) Field of Classification Search
  USPC ....................................... 703/13–16; 716/101
  See application file for complete search history.

(56) References Cited

U.S. PATENT DOCUMENTS

| | | | |
|---|---|---|---|
| 7,941,774 B2* | 5/2011 | Luan et al. ........................ 703/16 |
| 2004/0015798 A1* | 1/2004 | Davidson et al. .................. 716/5 |
| 2007/0136700 A1* | 6/2007 | Wang et al. ........................ 716/4 |

OTHER PUBLICATIONS

Göddeke et al. "Using GPUs to Improve Multigrid Solver Performance on a Cluster". Int. J. Computational science and Engineering. 2007. 20 pages.*
Owens et al. "GPU Computing"., 2008 IEEE., p. 879-899.*
Babb, et al., Logic emulation with virtual wires. IEEE Trans. on CAD 16(6): 609-626 (1997).
Baker, et al., Parallel event-driven logic simulation algorithms: Tutorial and comparative evaluation. IEEE Journal on Circuits, Devices and Systems 143(4):177-185 (1996).
Barzilai, et al. HSS—a high-speed simulator. IEEE Trans. on CAD 6(4): 601-617 (1987).
Bergeron, Writing testbenches: functional verification of HDL models, Kluwer Academic Publishers (2000).
Bryant, et al. COSMOS: a compiled simulator for MOS circuits. In Proc. DAC. 9-16 (1987).
Chandy, et al. Asynchronous distributed simulation via a sequence of parallel computations. Comm. ACM 24(4):198-206 (1981).
Chatterjee, et al. Gcs: High-performance gate-level simulation with GP-GPUs. In Proc. Date. 1332-1337 (2009b).
Chatterjee, et al., Event-driven gate-level simulation with gp-gpus. In. Proc. DAC. 557-562 (2009a).

(Continued)

*Primary Examiner* — Eunhee Kim
(74) *Attorney, Agent, or Firm* — Marshall, Gerstein & Borun LLP

(57) ABSTRACT

Techniques for simulating operation of a connectivity level description of an integrated circuit design are provided, for example, to simulate logic elements expressed through a netlist description. The techniques utilize a host processor selectively partitioning and optimizing the descriptions of the integrated circuit design for efficient simulation on a parallel processor, more particularly a SIMD processor. The description may be segmented into cluster groups, for example macro-gates, formed of logic elements, where the cluster groups are sized for parallel simulation on the parallel processor. Simulation may occur in an oblivious as well as event-driven manner, depending on the implementation.

39 Claims, 8 Drawing Sheets

(56) References Cited

OTHER PUBLICATIONS

Deng, et al., Taming irregular eda applications on gpus. In ICCAD '09: Proceedings of the 2009 International Conference on Computer-Aided Design, 539-546 (2009).

Edenfeld, et al., 2003 technology roadmap for semi-conductors. IEEE Computer 37(1): 47-56 (2004).

Frank, Exploiting parallelism in a switch-level simulation machine. Proc. DAC, 20-26 (1986).

Gulati, et al., Towards acceleration of fault simulation using graphics processing units. In Proc, DAC 822-827 (2008).

Gulati, et al. Accelerating statistical static timing analysis using graphics processing units. In Proc. ASPDAC 260-265 (2009).

Gulati, et al., Fast circuit simulation on graphics processing units. In Proc. ASPDAC, 403-408 (2009).

Karthik, et al., Distributed VLSI simulation on a network of workstations. In Proc. ICCD. 508-511 (1992).

Khronos Group. http://www.khronos.org/opencl/. Khronos Group, The OpenCL Specification, Oct. 2009, 308 pages.

Kim et al., Parallel logic simulation using time warp on shared-memory multiprocessors. In Proceedings of the 8th International Symposium on Parallel Processing, 942-948 (1994).

Kim et al., Communication-efficient hardware acceleration for fast functional simulation. In Proc. DAC, 293-298 (2004).

Kohler, et al., Code verification by hardware acceleration. ASIC/SOC Conference, Proceedings 14th Annual IEEE International, pp. 65-69 (2001).

Lewis a hierarchical compiled code event-driven logic simulator. IEEE Trans. on CAD 10(6):726-737 (1991).

Liu, et al. GPU-Based Parallelization for Fast Circuit Optimization, In Proc. DAC. 943-946 (2009).

Matsumoto, et al., Parallel logic simulation on a distributed memory machine. In Proc. EDAC, 76-80 (1992).

Meister A survey on parallel logic simulation. Tech. rep., University of Saarland, Dept. of Computer Science, Misra J (1993).

Misra Distributed discrete-event simulation. ACM Computing Surveys 18:39-65 (1986).

Perinkulam, et al., Logic simulation using graphics processors. In Proc. ITSW (2007).

Seiler, et al., Larrabee: a many-core x86 architecture for visual computing. ACM Trans. Graph. 27(3):1-15 (2008).

Shi et al., Gpu friendly fast poison solver for structured power grid network analysis. In Proc. DAC. 178-183 (2009).

Soulé et al., Parallel logic simulation on general purpose machines. In Proc. DAC. 166-171 (1988).

Chatterjee, et al., "Gate-Level Simulation with GPU Computing," ACM Transactions on Design Automation of Electronic Systems, 16(3):30-1 to 30-26 (2011).

Bauer, et al., Reducing Rollback Overhead in Time-Warp Based Distributed Simulation with Optimized Incremental State Saving, Proc. ANSS, 12-20 (1993).

Berry, et al., Speeding Up Distributed Simulation Using the Time Warp Mechanism, In Proc. of workshop on Making distributed systems work, 14 pages (1986).

Denneau, "The Yorktown Simulation Engine." Proc. DAC, 55-59 (1982).

Fujimoto, "Parallel Discrete Event Simulation," Comm. ACM 33(10):30-53 (1990).

Manjikian, et al., High Performance Parallel Logic Simulations on a Network of Work-stations, Proc. of workshop on Parallel and distributed simulation 23(1):76-84 (1993).

* cited by examiner

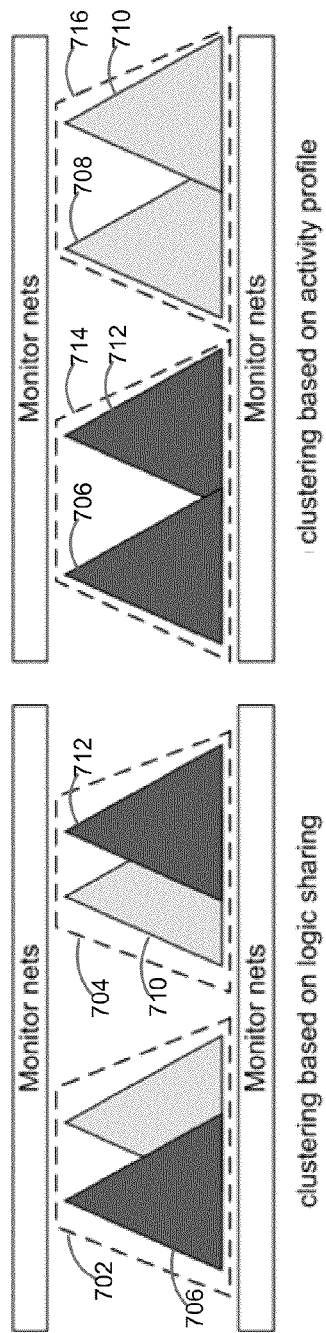

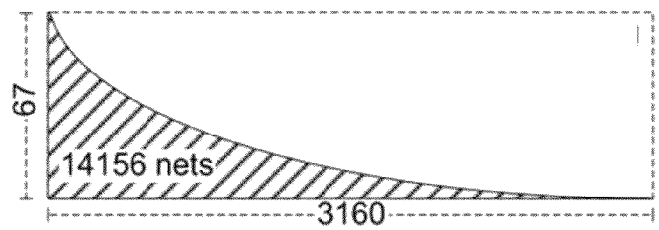
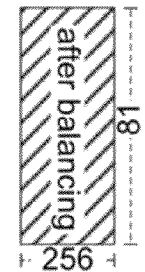
FIG. 8A  FIG. 8B
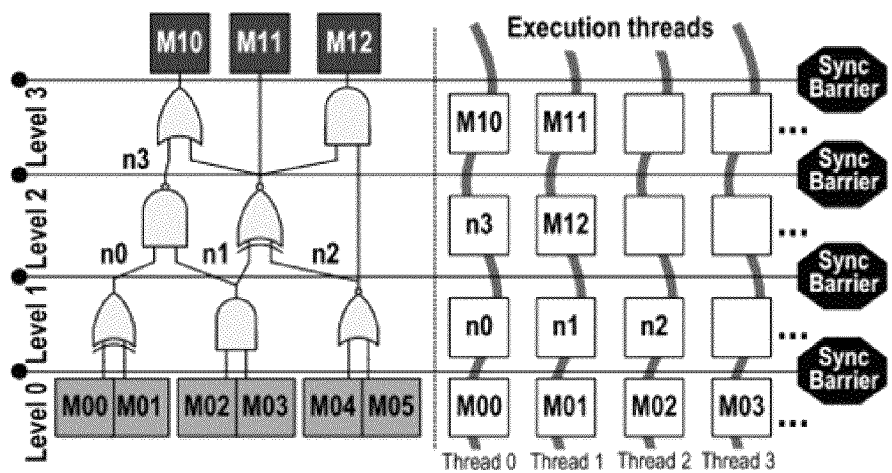
FIG. 9

GATE-LEVEL LOGIC SIMULATOR USING MULTIPLE PROCESSOR ARCHITECTURES

CROSS-REFERENCE TO RELATED APPLICATIONS

The present application claims the benefit of U.S. Provisional Application No. 61/326,212, entitled "Gate-Level Logic Simulator Using Multiprocessor Architectures," filed on Apr. 20, 2010, which is hereby incorporated by reference herein in its entirety.

STATEMENT OF GOVERNMENT INTEREST

This invention was made with government support under Contract No. HR0011-07-3-0002 awarded by Defense Advanced Research Projects Agency (DARPA). The United States Government has certain rights in this invention.

FIELD OF THE INVENTION

This disclosure generally relates to simulation of integrated circuits for validation and, more particularly, to oblivious and event-based techniques for simulating integrated circuit descriptions in multiple processor architectures.

BACKGROUND

Logic simulation is a central aspect of the integrated circuit (IC) development process and serves as the primary tool for verifying a wide range of aspects in a design. Foremost among these aspects is the correctness of a design's functional behavior, both as a behavioral description of the system, as well as a structural (gate-level) description. Most industry design flows invest the largest fraction of their time and resources precisely on this task, in an attempt to provide the best possible guarantee that the system satisfies its original functional specification. Often large server farms comprising thousands of machines are employed for months at a time to execute billions of cycles of simulation. Much of this time is consumed in simulation of gate-level netlists, which involves large netlists at a fairly low-level description, comprising many components that must be simulated. Overall the simulation and verification of an integrated circuit design is one of the most time consuming tasks in the entire development process; and the performance limitations of logic simulators are one its main reasons. The consequences are poor design coverage, delayed product releases and bugs that escape into silicon.

Logic simulation entails evaluating the response of an IC design over time when subjected to a set of input stimuli, typically selected by the designer to be representative of practical use situations. For most designs (synchronous), the response of the logic simulation is computed once for each cycle of simulated execution. Modern logic simulator implementations read in a design description, then "compile" the description to produce machine code emulating the same functionality as the design's primitives. Simulation finds application in many aspects of a design development process, including functional validation, power and timing estimation and checking of equivalence among different circuit representation. Gate-level netlists must be simulated for most of these applications.

Particularly problematic for logic simulators, however, is that simulation of structural netlists is a notoriously time-consuming process, yet essential to determine that if a synthesized design matches the initial design specifications and behavioral description. As circuit designs increase in size and features offered, they increase in complexity. As a result, there is an increasing need for improved performance by logic simulators for IC design.

SUMMARY OF THE INVENTION

The present application describes techniques for logic simulation of integrated circuit (IC) designs, using techniques that selectively partition and optimize descriptions of the IC design for more efficient simulation. The partitioning may be applied to netlist descriptions of an IC design and optimized for operation on an external processor. Once the netlist has been partitioned and optimized, it may be simulated either in an oblivious manner or in an event-driven manner. For the former, the simulation may proceed by computing the output values of logic component after logic component until the entire IC design is simulated. For the latter, the simulation may be performed by computing the output values only of those logic components, or groups of logic components for which certain event-based triggers have occurred (for instance a change in the input values), so that most of those components, whose output cannot experience a change in value, do not contribute to the computation time of simulation.

The logic simulator may be executed using a host processor and a general SIMD class processor. In some examples, the logic simulator is executed using a host processor and a general purpose graphics processor unit (GP-GPU) device. The logic simulator is able to leverage massive parallelism in suitable processor configurations to achieve large performance improvements over even the fastest modern commercial logic simulators.

In some examples, the logic simulator is a gate-level concurrent simulator that partitions a netlist, register transfer level (RTL), or other connectivity-based description of an IC, optimizes that description, and then maps it to a processor for simulation. In some examples, the mapping process includes clustering and gate balancing processes, which are optimized for the simulation processor.

In some examples, the logic simulator is optimized for integrated circuits with large structural netlists. By leveraging the parallelism offered by various types of processor architectures, in particular GP-GPUs, the simulator is able to leverage netlist clustering and balancing algorithms tuned for the target architecture.

In some examples, the logic simulator functions as an event-driven simulator so that only a fraction of a netlist's gates are simulated each cycle. In such examples, the logic simulator is to have minimal overhead for run-time event scheduling, as this is an intrinsically sequential process, while the simulator still needs to maintain a massively parallel computation environment most of the time. Thus, in some examples, the logic simulator is a hybrid simulator where clusters of gates (called macro-gates) are simulated in an oblivious fashion, while the scheduling of individual cluster groups is organized in an event-driven fashion.

In an embodiment a method for logic simulation of a connectivity level description of an integrated circuit, where the connectivity level description comprises a plurality of logic elements, comprises: in a first processor, clustering logic elements into cluster groups each comprising at least one of the plurality of logic elements, where the cluster groups are sized such that, during a simulation cycle, each cluster group is capable of being simulated on a different processor block of a second processor, wherein the processing units of the second processor are capable of simultaneous operation; and in the second processor, simultaneously simulating a plurality of the cluster groups each being simulated on a different one of the processing units.

In some such examples, the connectivity level description is a netlist and the logic elements are logic gates within the netlist.

Furthermore, some of these examples further comprise separating the cluster groups into one of a plurality of layers, from a lowest level layer to a highest level layer.

In some examples, each cluster group is defined by a gap height, which is the number of logic levels in a longest logic chain within the cluster group, and a lid width, which is the number of logical output values provided by the cluster group after the simulation cycle. Some of these examples further comprise adjusting the respective gap height and lid width for each cluster group such that the cluster group is capable of simulation on one of the processing units.

In another embodiment, a logic simulator for simulating a connectivity level description of an integrated circuit, where the connectivity level description comprises a plurality of logic elements, comprises: a parallel processor having a plurality processing units capable of simultaneous execution by the parallel processor; and a host processor configured to, cluster logic elements into cluster groups each cluster group comprising at least one of the plurality of logic elements, where the cluster groups are sized such that each cluster group is capable of being simulated on one of the processing units of the parallel processor, and map each cluster group for simulation by one of the plurality of processing units.

In some examples, the parallel processor comprises a SIMD, general purpose graphics processing unit (GP-GPU) architecture, or compute unified device architecture (CUDA) architecture. In some of these examples, the parallel processor comprises a plurality of cores each having a plurality of the processing units. In some examples, the parallel processor comprises a device memory connected to each of the plurality of cores and a shared memory, wherein the shared memory is configured for simultaneous access by each of the processing units within one of the cores, during a processing cycle.

BRIEF DESCRIPTION OF THE DRAWINGS

For a more complete understanding of the disclosure, reference should be made to the following detailed description and accompanying drawing figures, in which like reference numerals identify like elements in the figures, and in which:

FIGS. 7A and 7B illustrate macro-gates formed by clustering operations based on logic sharing (FIG. 7A) and activity profile (FIG. 7B), in accordance with an example;

FIGS. 8A and 8B illustrate an example balancing of cluster groups in accordance with an example;

FIG. 9 illustrates an example simulation of the macro-gate for the sample netlist of FIG. 5;

DETAILED DESCRIPTION

Figure 1:
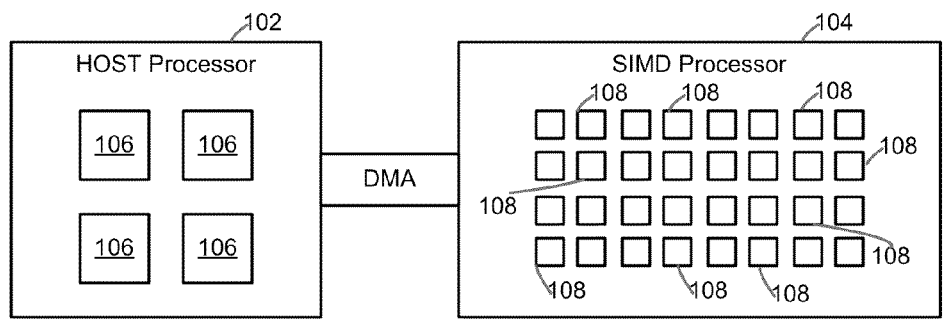
FIG. 1 illustrates a configuration for a logic simulator in accordance with one example of the instant application, and showing a host processor and a parallel processor.

The present application describes techniques for logic simulation of integrated circuit (IC) designs, using partitioning and optimization techniques that may be initiated under different conditions, including from event-based triggers. The logic simulators may be executed on general SIMD class processors. In some examples, however, the logic simulator is executed on a general purpose graphics processing unit (GP-GPU), for example, that allows software applications to run parallel processes across different functional pipelines. More specifically, in some examples a particular class of GP-GPU architectures are used, namely a compute unified device architecture (CUDA), which is a parallel computing architecture provided by NVIDIA Corporation, of Santa Clara, Calif., in various processors. These processor configurations are provided by example, not limitation. In each of these processor types as well as other applicable architectures, the logic simulator may leverage massive parallelism to achieve large performance improvements in IC circuit simulation and testing. In some examples, the logic simulator is optimized for integrated circuits with large structural netlists. By leveraging the parallelism offered by SIMD, GP-GPUs, CUDAs, etc., a logic simulator is capable of applying a netlist balancing process tuned for the target architecture.

In some examples, the logic simulator may be implemented as a gate-level concurrent simulator having a design compilation process that partitions a netlist, register transfer level (RTL), or other connectivity-based description of an IC. The simulator may optimize that netlist, etc., and then map gates thereof to the processor architecture. To achieve improvements in performance, the simulator clusters the gates for simulation and balances these clusters for simulation in a parallel processing environment. Thus, in some examples, the particular clustering and gate balancing is optimized for more efficient utilization depending on the processor architecture.

In some examples, the logic simulator may be implemented as an oblivious simulator that evaluates each gate during each simulation cycle. In other examples, the logic simulator is an event-driven simulator that only evaluates a gate in response to particular events, such as if a change occurs at a gate's input nets. Oblivious simulators can offer very simple scheduling, static data structures and better data locality. While event-driven simulators rely upon a dynamic analysis of which gates must be scheduled for re-evaluation.

In some event-driven designs, the logic simulator is configured such that only a fraction of a netlist's gates are simulated each cycle. The logic simulator may, for example, be designed to use minimal overhead for run-time event scheduling, as this is an intrinsically sequential process, while the simulator still needs to maintain a massively parallel computation environment most of the time. The clustering and balancing, therefore, may be hybridized with an event trigger-based solution. For example, the logic simulator may cluster gates (e.g., into macro-gates) that are simulated in an oblivious fashion, but the scheduling of individual cluster groups is organized in an event-driven manner.

FIG. 1 is a high level illustration of a computing environment 100 for executing a logic simulator of an IC design. In some examples, a first processor 102 is a stand-alone processor capable of executing sequential code operations for the simulator and that works together with another stand-alone processor, a SIMD processing unit 104. In an example, the first processor 102 is implemented as a physically separate processing unit, e.g., a general-purpose central processing unit (CPU), while the SIMD unit 104 is implemented as another processing unit in the form of a general-purpose graphics processing unit (GP-GPU). In other examples, the processor 102 and the SIMD unit 104 reflect different processors within the same processing unit. For example, both 102 and 104 may be implemented in a single, multiple processor architecture, that performs clustering and balancing and mapping in one embedded processor thereof for simulation in other embedded processors thereof. In some of these examples, the units 102 and 104 are the same SIMD processor.

The host processor 102 and the SIMD unit 104 may be connected via a direct memory access (DMA) 103, which is provided by way of illustration, as any suitable wired or wireless communication channel between the processors may be used. In an implementation, computationally-intensive, parallel code operations of the simulator 100 are offloaded to the processing unit 104 for execution. Typically, the processor 102 functions as a host processor and is a single core processor or a multi-core processor with only a few cores. In the illustrated example, the processor 102 has four cores 106. The SIMD unit 104 in contrast is to have many cores 108, many more than the host processor 102. These cores may be hardware or software based. In some examples, they each reflect a different processor executing a dedicated thread execution block; where in some of these examples, the cores are distributed over different processors. As used herein, "core" refers to a grouping of processing units. A SIMD processor for example may comprise multiple cores, each comprising multiple processing units, each processing unit capable of executing a different thread and in parallel.

The processor 102 is able to map code onto these cores 108 for parallel execution. Twenty four cores 108 are shown, by way of example (though not all are labeled with a reference number). In most examples, the SIMD unit 104 will have much larger numbers of cores that may be segmented into different processors. Example SIMD processors may have 80, 96, 192, 240, or 320 cores; although, the processors are not limited in the number of cores. Each core functions as a processor block. By way of example, not limitation, these cores may be implemented with 16 bit, 64 bit or 128 bit architectures; further, in some examples they may each include dedicated floating point processors. The logic simulator is able to take advantage of any number of cores on the SIMD unit 104. Thus to allow for a massive parallel execution of netlist simulation, the SIMD unit 104 is not limited to a particular number of cores.

Figure 2:
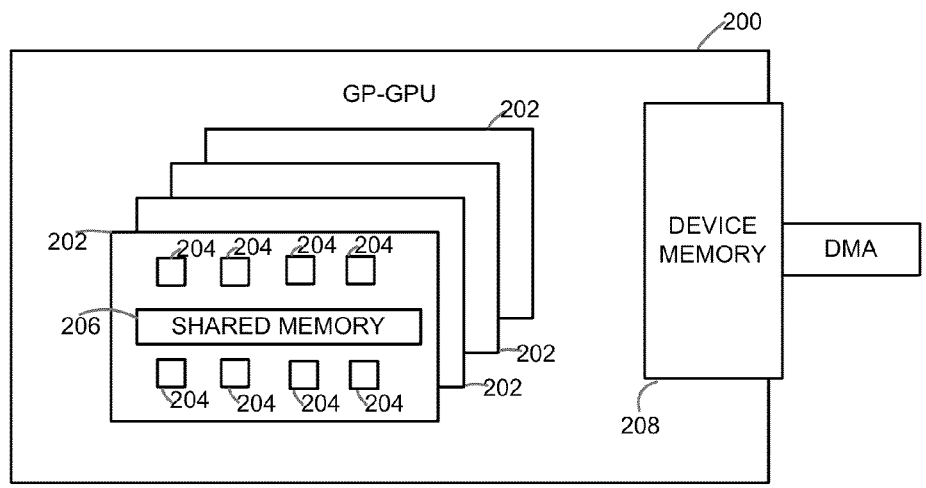
FIG. 2 illustrates an example implementation of the parallel processor of FIG. 1.

FIG. 2 illustrates a particular example of the SIMD unit 104 as a GP-GPU 200. The GP-GPU 200 includes a limited shared memory space for parallel processes running on the processor 200, as well as additional components designed to optimize the execution of graphic-processor specific memory (e.g., texture memory). Examples of the GP-GPU 200 are the CUDA processors available from NVIDIA Corporation of Santa Clara, Calif. In any event, the GP-GPU 200 is able to operate as a co-processor capable of executing many threads in parallel. In some examples, logical simulation code is compiled by the host processor 102 to a proprietary instruction set and the resulting program, called a kernel, is executed on the GP-GPU 200, with each parallel thread running the same kernel code on distinct data blocks.

The GP-GPU processor 200 includes a plurality of cores 202, each having processing units 204 delineated in hardware. The processing units 204 can execute multiple threads concurrently, e.g., up to 512 or more simultaneous threads at the same time. In some examples, each core 202 executes blocks of threads, all running the identical kernel code. As a part of the GP-GPU architecture, a fast, shared memory 206 is available to each core 202, and more particularly to each processing unit 204 of that core 202. In some examples, this shared memory 206 is accessible within 1 clock cycle. A device memory 208 is also provided on the GP-GPU 200, and would typically be sized between 256 MB to 2 GB depending on the application; although larger memories may be used. The device memory 208 is accessible by all the cores 202, but with a clock with a latency typically larger than that of the shared memory, for example, a latency of 300 to 400 clock cycles. This latency may be masked by time-interleaving thread execution within a core; for example, while a group of threads is executing on local data, others are suspended, waiting for their data to be transferred from the device memory. In the illustrated example, all execution takes place on the SIMD unit 104 (or the GP-GPU 200), while the host processor 100 serves only to invoke the beginning execution of a thread batch and waits for completion of one or more cycles of netlist simulation.

Figure 3:
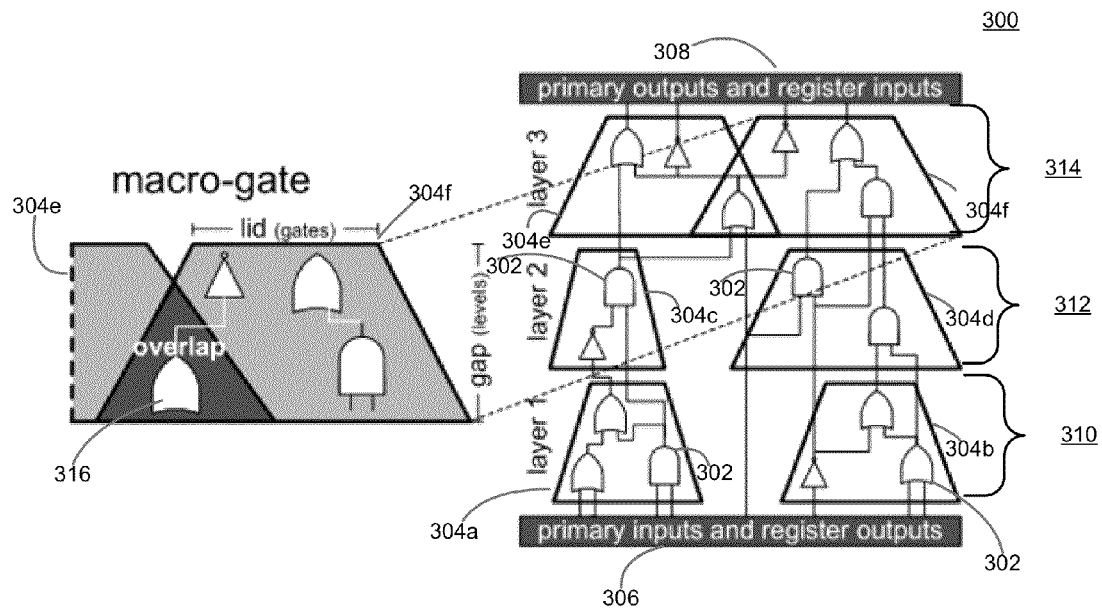
FIG. 3 is a gate-level illustration of clustering on a portion of netlist as part of a logic simulation performed by the host processor of FIG. 1 to form cluster groups, e.g., macro-gates.

FIG. 3 is a gate-level illustration of a macro-gate clustering operation 300 as performed by a logic simulator in accordance with an example. The operation 300 may be implemented via both the host processor 100 and the SIMD unit 104, e.g., the GP-GPU 200. A series of gates 302 (only some of labeled) form a netlist of an IC design. The operation 300 clusters these gates into different macro-gates 304a-f. This clustering may be implemented as part of an oblivious simulation process of the logic simulator. A series of primary inputs and register outputs 306 are coupled to the gates, resulting in a series of primary outputs and register inputs 308 during a simulation cycle.

In some examples, the operation 300 may have a hybrid nature in which the logic simulator not only applies an oblivious simulation approach to clustering (e.g., to simulate every logic gate in the design at every simulation cycle), but also an event-driven approach that limits the number of cluster groups being simulated at any given time. Thus, while the oblivious simulation for clustering has the advantage of uniform control flow; to prevent superfluous computation of gates whose inputs did not change, the event-driven simulation can determine which subset of the gates should be simulated each cycle, e.g., by only simulating those gates whose input values have changed.

Three factors may guide the process of macro-gate formation, as shown in FIG. 3. (i) For macro-gates that are used in an event-driven simulation at a coarse granularity (compared to individual gates), the time required to simulate a certain macro-gate should be substantially larger than the overhead to decide which macro-gate to activate. (ii) The microprocessors in the GPU communicate through slower device memory: and as such the cores are able to execute independent of each other. This is assured if the macro-gates that are simulated in parallel can be simulated independently of each other. Thus the macro-gate formulation process may achieve this goal by duplicating small portions of logic among the macro-gates, thereby eliminating the need for communication. (iii) Cyclic dependencies between macro-gates may be avoided in order to simulate each macro-gate at most once per cycle, implying that the netlist can be levelized at the granularity of macro-gates as well.

In the illustrated example, the clustering operation 300 partitions the macro-gates into layers 310-314, each layer encompassing a fixed number of netlist levels. The macro-gates 304 may then be defined by selecting a set of nets at the output boundary of a layer and then including the cone of influence extending from those output nets backward to the layer's input nets—the tapering shape is that of a trapezoid. Three layers 310-314 are shown in the illustrated example, each layering having two levels of gate logic. However, any number of layers and levels, larger or smaller, may be used. The number of levels within each layer is termed the gap height and corresponds to the height of the macro-gate, i.e., the number of logic levels in the longest logic chain within a macro-gate.

In the operation 300, some logic gates have been assigned to more than one macro-gate. Logic gate 316, for example, has been duplicated into two macro-gates, 304e and 304f, for computation of respective output nets.

There are several possible policies for selecting the nets whose cones of influence will be clustered by the process 300 into a single macro-gate. To minimize duplication, for example, the logic simulator can attempt to cluster those nets whose cones of influence have a maximum number of gates in common. The number of output nets used to generate each macro-gate is a variable parameter, termed the lid. In some examples, the logic simulator executing the process 300 exemplified in FIG. 3 may select the value for the lid parameter so that the number of logic gates in all macro-gates 304a-304f is approximately the same.

Figure 4:
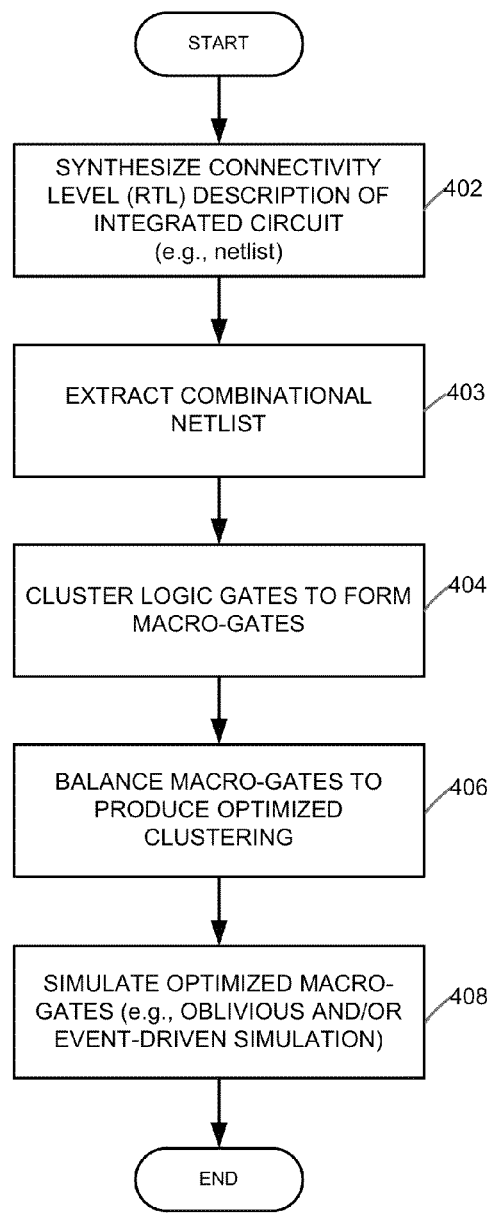
FIG. 4 is a flow diagram of a logic simulation process in accordance with an example.

FIG. 4 illustrates a process 400 implemented by a logic simulator running on the host processor 100 and SIMD UNIT 104 to form macro-gates as illustrated in FIG. 3. In an embodiment, at a block 402, the host processor 100 synthesizes a register transfer level (RTL) description of an IC design, such as the netlist. For example, the host processor 100 performs a compilation, where the CPU 100 receives a gate-level netlist as input, compiles the netlist and maps the netlist into a SIMD unit 104, or in this example to the GP-GPU 200.

Next, the host processor 100 extracts the combinational logic elements (e.g., AND, OR, NOT, XOR, etc.) from the netlist at block 403 for the purpose of setting up an initial netlist to be mapped for simulation. At block 404, the host processor 100 then partitions the netlist into cluster groups, e.g., macro-gates such as 304, which are logic blocks appropriately sized to fit within the constraints of the SIMD architecture, e.g., with the constraints of a GP-GPU or CUDA architecture. The block 404, for example, may prepare preliminary (or rough) cluster groupings based on size estimates quickly computed on the fly. At block 406, the CPU 100 then balances these preliminary cluster groupings through an optimization process, restructuring cluster groups to improve compute efficiency during simulation. The block 404, for example, may perform a SIMD-independent clustering of netlist gates; whereas the block 406 may perform a SIMD-processor specific optimization of the generated cluster groups to form balanced macro-gates that simulate efficiently on the SIMD unit 104, e.g., the GP-GPU 200. In some examples, the block 406 balances the clusters to maximize efficiency, although maximization is not required. Finally, all the required data structures are compiled into the SIMD kernel and transferred to the SIMD device. The optimized macro-gates partitioned design is then simulated at block 408.

The block 402 may be implemented through any number of synthesis techniques. The process 400 generally uses a gate-level netlist as the input, where this input is either a synthesized version of a design under verification, or a behavioral description to which a synthesis step is applied. Such synthesis may or may not be optimized for time, power, area, or any other metric.

Figure 5:
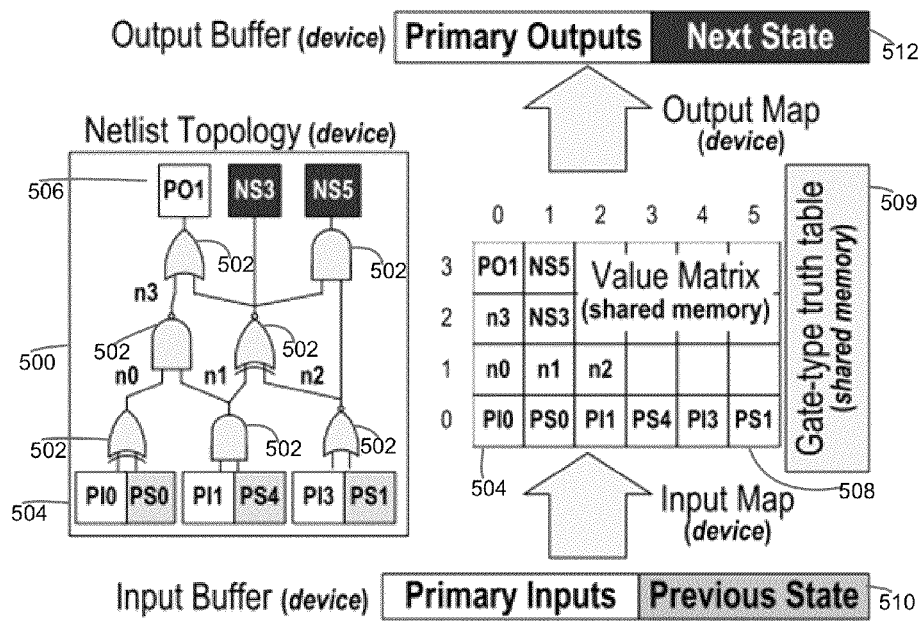
FIG. 5 is an illustration of an extracted combination portion of a netlist in accordance with an example.

In operation, the block 403 may extract the combinational portion of the gate-level netlist and map it to the GP-GPU 200, creating data structures to represent the gates, as well as their input and outputs. An example illustration of an extracted combination portion of a netlist is shown in FIG. 5. A combinational portion of a netlist topology 500 contains a plurality of logic gates 502, having plurality of corresponding inputs 504 from a lower level region and a plurality of outputs 506 to a higher level region. These reflect the structures required for simulation of the portion 500. The block 404 may establish a value matrix 508 which stores the intermediate net values for simulation of the portion 500. In the illustrated example, there is a one-to-one correspondence between a row of intermediate values and the various levels of logic on the netlist 500. As a thread is executing during simulation, the GP-GPU 200 may be able to store and retrieve intermediate net values using the local shared memory 206. In the illustrated example, each net of the matrix 508 requires 2 bits of storage in a 4-valued simulator, where all these values may be stored in the faster shared memory 206. The shared memory 206 may also store gate-type truth tables 509 consulted for the evaluation of each gate.

All other data structures associated with the simulation may reside in the device memory 208. That is, in the illustrated example, input buffer values 510 may be stored in the device memory 208, along with output buffer values 512 of the entire netlist simulation. The netlist topology information may be stored there as well. Thus, data such as the netlist topology information that is required often may be stored in the device memory 208. However, in the example described, data to be shared among threads is stored locally.

Figure 6:
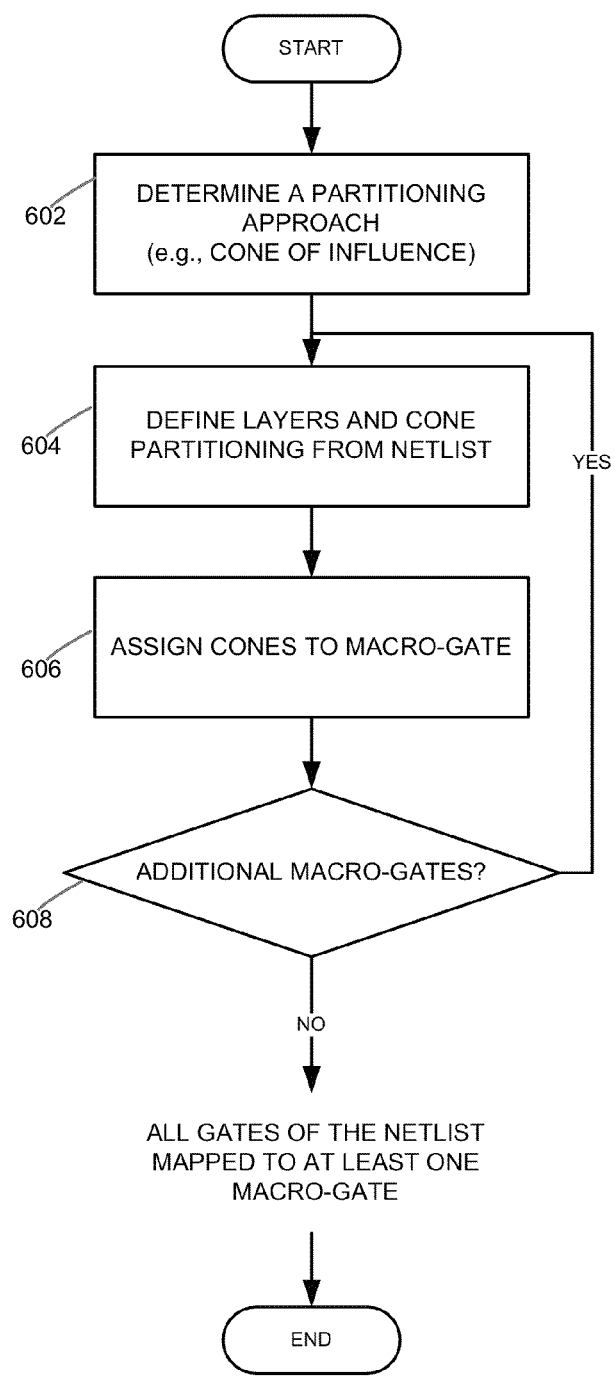
FIG. 6 is a flow diagram of clustering as performed in the process of FIG. 4 in accordance with an example implementation.

FIG. 6 illustrates an example clustering process 600 that may be executed by the block 404 of FIG. 4 and by the host processor 100. First a block 602 determines what type of partitioning approach is to be applied to the netlist, such as cone partitioning illustrated in this example. While an example fanout-cone partitioning is described, it is understood that other types of partitioning may be used, including mini-cut partitioning, fanin-cone partitioning, random clustering, etc. Block 604 may separate the netlist into layers and then into preliminary clusters of gates, in this example cones, where each cluster group after completion is to be formed into one or more macro-gates that are each executed on a different thread block (i.e., the cores 204) of the GP-GPU 200. Some GP-GPU architectures, such as CUDA architectures, do not allow information transfer among thread blocks within a simulation cycle; therefore all thread blocks are to execute independently. In other examples, this need not be the case. The block 602 may be implemented to minimize redundant computation of gates, maintain data structure organization, and maximize data locality. Thus, the cluster groups may be self-contained and not require communication with other cluster groups within a simulation cycle, which are features of cone partitioning.

Generally speaking, for cone partitioning, the netlist is viewed as a set of logic cones, one for each of the netlist's outputs. The block 604 transmits preliminary partition data to a block 606, where each identified cone by block 604 includes all the gates that contribute to the evaluation of the cone output. The block 606 analyzes these cones and assigns them to macro-gates (i.e., cluster groups). The process 600, for example, may operate one macro-gate at a time, as illustrated, or may define multiple macro-gates at once.

Due to the lack of inter-cluster communication capability, each macro-gate is to include one or more cones of logic; and each cone is fully contained within a macro-gate. As a result, once a macro-gate has been completely simulated by the process 400, one or more output values have been computed and can be stored directly into an output buffer vector. In forming the cones into macro-gates, the block 606 may produce cone overlap, which necessarily requires that some gates are duplicated, because they belong to multiple cones. The incidence of this extra computation is small in practice. In execution, the block 606 may assign one cone of logic to the cluster group from block 604, and add additional cones to this cluster group until memory resources have been exhausted. Various criteria for adding cones may be used, such as the maximal number of overlapping gates, where, for example, a second logic cone is selected so that it is the cone that overlaps the most with the first cone. In other words, the block 604 may create all the cones of logic per the partitioning approach, e.g., by taking each output wire from a layer and finding all the gates that contribute to compute the value of that wire. The block 606 then is able to pack together several of these cones to make a macro-gate. How many cones may be chosen is based on how much shared memory (which is fast to access) is available on the platform. One way to fit more cones into a macro-gate is to assign cones with a large number of gates in common. For instance, if cone A is comprised of 20 gates, and cone B is comprised of 25 gates, and cones A and B have 15 gates in common, then the block 606 could assign these two cones to the same macro-gate and generated a macro-gate comprising 20+25−15=30 gates, a reduction of 15 gates from the potential 45.

The block 606 determines macro-gate sizing. To do this, two macro-gate parameters are considered: the gap and the lid, which collectively control the granularity at which an event-driven mechanism operates. The block 606 may determine gap and lid values for the macro-gates by evaluating a range of candidate <gap,lid> value pairs. For each candidate pair, the block 606 may assess several metrics: number of macro-gates, number of monitored nets, size of macro-gates, and/or activation rate. The activation rate may be obtained by a mock-up of the simulation on a micro testbench, for example. Once the candidate gap, lid pairs have been determined, the block 606 may then select the locally optimal values for the gap and lid pair.

The processes 400 and 600 may be written in C, C++, or other suitable programming language.

The boundaries for the range of gap values considered may be derived from the number of monitored nets generated, e.g., considering only gap values for which no more than 50% of the total nets are monitored. In practice, small gap values tend to generate many monitored nets, while large gap values trigger high activation rates. For determination of the lid value, the block 606 may bound the analysis by estimating how many macro-gates will be created at each layer, striving to run all the macro-gates concurrently. Such determination may be based on the number of cores (e.g., 202) on the particular GPU architecture being used. For a CUDA architecture that includes 14 microprocessors and a CUDA scheduler that allows at most three thread blocks in concurrent execution on the same core, the block 606 may thus consider lid values that generate no more than 14×3=42 macro-gates per layer.

In other examples, the clustering of cones used to form macro-gates may be based on an activity profile. Any macro-gate containing a frequently activated logic gate will result in the entire macro-gate being simulated. As such, the block 606 may seek to consolidate logic cones with frequently activated logic gates into the same macro-gate. FIGS. 7A and 7B show an example of clustering based on estimated activity profile, e.g., activation rates, where the shading of a cone indicates its activation frequency.

FIG. 7A shows two macro-gates 702 and 704 each with corresponding cones 706/708 and 710/712, respectively, where cones 706 and 712 are shaded to indicate a higher activity cone while cones 708 and 710 are lower activity cones. The block 606 may cluster the cones by degree of logic sharing, as shown in FIG. 7A, as discussed above. The result, in this example, is that two higher activity cones 706 and 712 are clustered with the lower activity cones 708 and 710, resulting in both macro-gates 702 and 704 having high activation frequencies. In other examples, the block 606 may cluster based on the activation rates (e.g., activation frequency), such that the high activity cones 706 and 712 are placed in the same macro-gate 714 (FIG. 7B), while the lower activity cones 708 and 710 are placed in the other macro-gate 716. The result is frequently activated macro-gates with other macro-gates that are rarely activated. This may or may not result in a higher degree of gate duplication as shown by the lesser overlap of the cones; yet in some examples, this trade-off is justified by the significant reduction in the total number of macro-gate simulations that are to be performed.

Profiling may be used to estimate activity profiles, for example, first simulating a micro-testbench (10,000 cycles long) on a segmented circuit using the default clustering policy. During this simulation, the activation rates of each logic cone in each layer may be aggregated. The activation frequency of a cone is defined as the maximum of the activation frequency of all of its input wires, because that cone will need to be simulated if any of the input nets undergoes a value change. However, the input nets which form the base of the cone are part of monitored nets. Hence, the activation frequency of all cones can be computed by recording the activation frequency of the monitored nets. Once these are computed, the segmentation process is performed again, but cones are added to macro-gates based on activation frequency rather than simply by logic sharing.

The block 606 determines the value of gap and lid, but these do not necessarily have to be constant during an entire clustering process. In fact, from an activity stand point, the gap parameter may vary, for example, with lower level gates being the most frequently active. To address this, an annihilation ratio of a logic cone may be defined as the ratio of the activation frequency at the apex of the cone and the maximum of the activation frequencies of the wires at the base of the cone. In an example, the block 606 reaches the ideal gap value when the number of logic levels in a cone results in a sufficiently low value of this annihilation ratio for all the cones in a layer. In fact, the number of levels needed may vary from cone to cone, such that the block 606 can locally vary values of a gap, with a macro-gate being composed of a few cones reaching the desired value of annihilation ratio, within the same number of levels, and the lid being a byproduct thereof. For example, the gap value may vary such that within a macro-gate different gap heights are present, instead of the purely trapezoidal shape in the example of FIG. 3. Across the lid, the lower gap heights may be formed within the macro-gate.

In FIG. 6, block 608 determines if additional cluster groups are to be formed; and, if so, control is returned to block 604. If not, the clustering process is completed when all gates have been mapped to a set of cluster groups, preferably by minimizing logic overlap while satisfying the constraints of shared memory resources.

An example dataflow chart illustrating example steps, in pseudocode form, is provided below.

```
clustering (netlist){
    sort(output_cones)
    for each (output_cone) {
        new cluster = output_cone;
        while (size(cluster) < MAX SIZE) do {
            cluster += max overlap(
                output cones, cluster);
        } append (cluster, clusters);
    }
    return clusters;
}
```

Returning to FIG. 4, the block 406 performs balancing on the macro-gates provided by process 500. This balancing may seek to minimize the critical execution path of thread blocks (macro-gates) on the GP-GPU 200. For example, the block 406 may consider each defined macro-gate individually and optimize the scheduling of each gate simulation so that the number of logic levels is minimized. The simulation latency of a single cycle is limited by the macro-gate with the most logic levels, since each additional level requires another access to the slower device memory. Considering the number of logics levels (gap) and the number of concurrent threads simulating distinct gates (lid), the block 406 balances these within the constraints of the SIMD UNIT 104 architecture. With the GP-GPU 200 it is desired to have a maximum of 256 concurrent threads. Although more or fewer concurrent threads may be executed depending on the processor architecture.

The cluster balancing of block 406 may reshape the natural triangular macro-gates to a rectangular shape with a 256-wide base. Macro-gates tend to be triangular in visual depiction, because they are a collection of cones of logic, which are usually triangular where a wide set of inputs computes one output through several stages of gates. An example clustering operation is illustrated in FIGS. 8A and 8B. The original macro-gate has a base width of 3,160 gates and a height of 67 levels of logic, where most of the deeper levels require significantly less than 3,000 threads. In SIMD-based processors, including GP-GPU and CUDA, simulation on the macro-gate would required 3,160 simultaneous threads at Level 0, and the same number of occupied threads until all 67 levels of simulated code has been completed, even though after each successive logic level fewer threads will be functions. The block 406 reshapes the macro-gate execution scenario into a more efficient rectangular shape scenario with a base width of 256 gates, i.e., 256 simultaneous threads that are used consistently through all logic levels. In the illustrated example, the balanced macro-gate executes over a larger cluster height (81 versus 67) than would have occurred prior to balancing. But the tradeoff results in substantially larger efficiency of operation, as fewer gates are required to simulate the macro-gate (256 versus 3160).

An example dataflow chart illustrating example steps, in pseudocode form, is provided below.

```
balance_cluster( ) {
    for each level in height
        for each column in width
            balanced_cluster[level][column] =
                select_gate( )
```

```
        }
    }
    return balanced_cluster
}
select_gate( ) {
    sort gates in cluster by height
    for each gate in cluster {
        if not assigned_to_balanced_cluster(gate)
            return gate
    }
}
```

The balancing process of FIG. 4 may include, for example, setting a macro-gate width parameter to W (i.e., W gates can be simulated concurrently in each level). Then sorting the gates in a macro-gate by level, where gates at Level 0 are first. Fill W slots at each level, starting from Level 0, until all gates are mapped to a slot to complete the balancing.

In the illustrated example of FIG. 4, after the balancing at the block 406, the process 400 will have generated a finite number of macro-gates, optimized them and generated all the support data structures necessary for the kernel code to simulate all gates in a netlist with a high level of parallelism on the GP-GPU 200. At this point, cluster data for the macro-gates and kernel code can be transferred to the GP-GPU 200, or other SIMD unit more generally, and simulated cycle-by-cycle at block 408.

Simulation begins with the host processor 100 transferring the kernel code and data structures to the SIMD unit 104 (e.g., the GP-GPU 200). In some examples, the SIMD unit 104 takes over, without the assistance of the CPU 100, and schedules the defined macro-gates for parallel execution. When all macro-gates have executed, one simulation cycle is complete, and the SIMD unit 104 may return control to the host processor 100, which may read the primary outputs, evaluate the testbench, set primary inputs and invoke the next cycle. In other examples, the SIMD unit 104 may perform multiple consecutive simulation cycles before communicating with the host processor 100 and returning control to the host processor 100, for evaluating inputs and the testbench. Whether communication between the SIMD unit 104 and the host processor 100 occurs after each cycle or more infrequently may be determined by the testbench.

In some examples, macro-gate execution on the SIMD UNIT 104 proceeds in three phases: scattering, logic evaluation and gathering. During scattering, the macro-gate's primary input data is retrieved from the device memory 208 and copied to the value matrix of FIG. 5 stored in the local shared memory 206. Next, logic evaluation progresses when each thread begins execution. The threads, each simulating one gate of the macro-gate, retrieve the relevant portion of the netlist from the device memory 208, as well as gate truth tables and net matrices from the local shared memory. With this information, the threads evaluate their gates by consulting the truth table. Computed results are copied from the value matrix to the output buffer vectors in the device memory 208. Finally, the threads synchronize after simulating their respective gates and the process is repeated for all the subsequent logic levels in the macro-gate. FIG. 9 shows an example of macro-gate execution for the sample netlist of FIG. 5. Six simultaneous, simulation threads are shown (Thread0-Thread5), corresponding to the six inputs required at Level0. At Level1, Thread0-Thread2 are used to each simulate a corresponding Level1 gate, producing gate output values n0, n1, and n2, respectively. The process continues through Level2 and Level3, with the outputs for each thread synchronized after each level execution.

The simulation performed by the block 408 may be carried out directly on the SIMD UNIT 104, e.g., the GP-GPU 200. The overall simulation may alternate between execution of all active macro-gates in a layer, followed by observing the value changes in the monitored nets of the next layer to determine which macro-gates will be activated over the next level. Each individual macro-gate is simulated by a single thread block in an oblivious fashion. For simulation, the block 408 may include two kinds of parallelism: first, multiple independent macro-gates are simulated by independent thread blocks possibly executing in parallel on different multi-processors within the SIMD UNIT 104; and second, the gates at the same level inside a macro-gate are simulated in parallel by different threads.

Each macro-gate corresponds to one thread block, and each core executes multiple thread blocks. Three concurrent thread blocks in a core for example requires assigning 3 macro-gates per core. The cores can execute more or fewer macro-gates. For example, the simulation block 408 can allocate one macro-gate per core, which allows for a larger macro-gate. Generally speaking, however, memory access latency is better optimized with multiple thread blocks assigned per core. In some examples, an internal scheduler in the GP-GPU 200 is responsible for determining which core will compute which thread blocks, hence the scheduling of macro-gates after they have been marked for simulation is internal.

Figure 10:
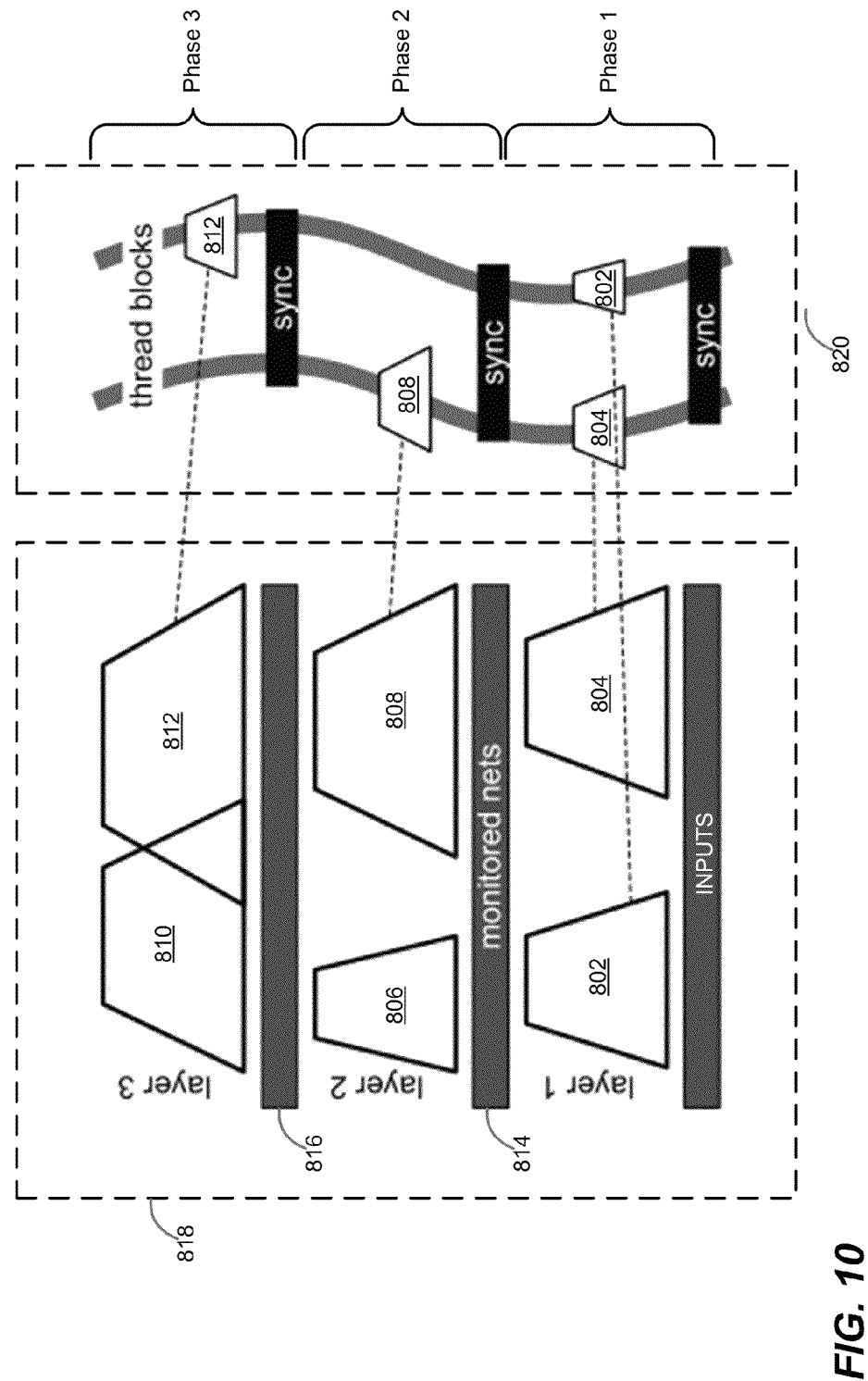
FIG. 10 is an illustration of an example event-driven simulation for an entire circuit design description, as may be executed by the parallel processor of FIG. 1.

The simulation block 408 may, in some examples, simulate the macro-gates using an event-based triggering mechanism. FIG. 10 illustrates an example event-driven simulation operation 800. The illustration shows a layered structure of macro-gates 802-812 and monitored nets 814 and 816. The illustration also shows how only activated macro-gates from the pool of macro-gates 802-812 at each layer are scheduled for execution.

In some examples, the simulation block 408 is executed through two kernels alternatively or simultaneously executing on the SIMD UNIT 104. Operating within the SIMD unit 104, a simulation kernel 818 simulates all active macro-gates in a layer. Also operating in the SIMD unit 104, a scheduling kernel 820 evaluates the array of monitored nets associated with the simulated layer to determine which macro-gates should be activated in the next layer.

In the illustrated example, a single layer is simulated each simulation phase, where all layers (layer1-layer3) are simulated during a single simulation cycle. During phase1 of a simulation cycle, macro-gates 802 and 804 are active and under simulation, because both have been scheduled by the scheduling kernel 820, as shown. The scheduling kernel 820 monitors the resulting output nets 814 from phase1 and determines which macro-gate inputs have changed as a result. In this example, that is macro-gate 808 only. The kernel 820 performs a synchronization to begin phase2 and activates the macro-gate 808 for simulation by the kernel 818. During phase2, therefore, only macro-gate 808 is simulated, not the layer 2 macro-gate 806 formed by the block 406. For layer 3, two overlapping macro-gates 810, 812 have been formed. In the illustrated example, at the end of phase2, the kernel 820 determines from the monitored nets 816 that only the inputs for macro-gate 812 have changed. Therefore, only that macro-gate is activated for simulation during phase3. During the next simulation cycle, the kernel 818 may simulate a different set of the macro-gates 802-812 as determined by the scheduler 820.

Figure 11:
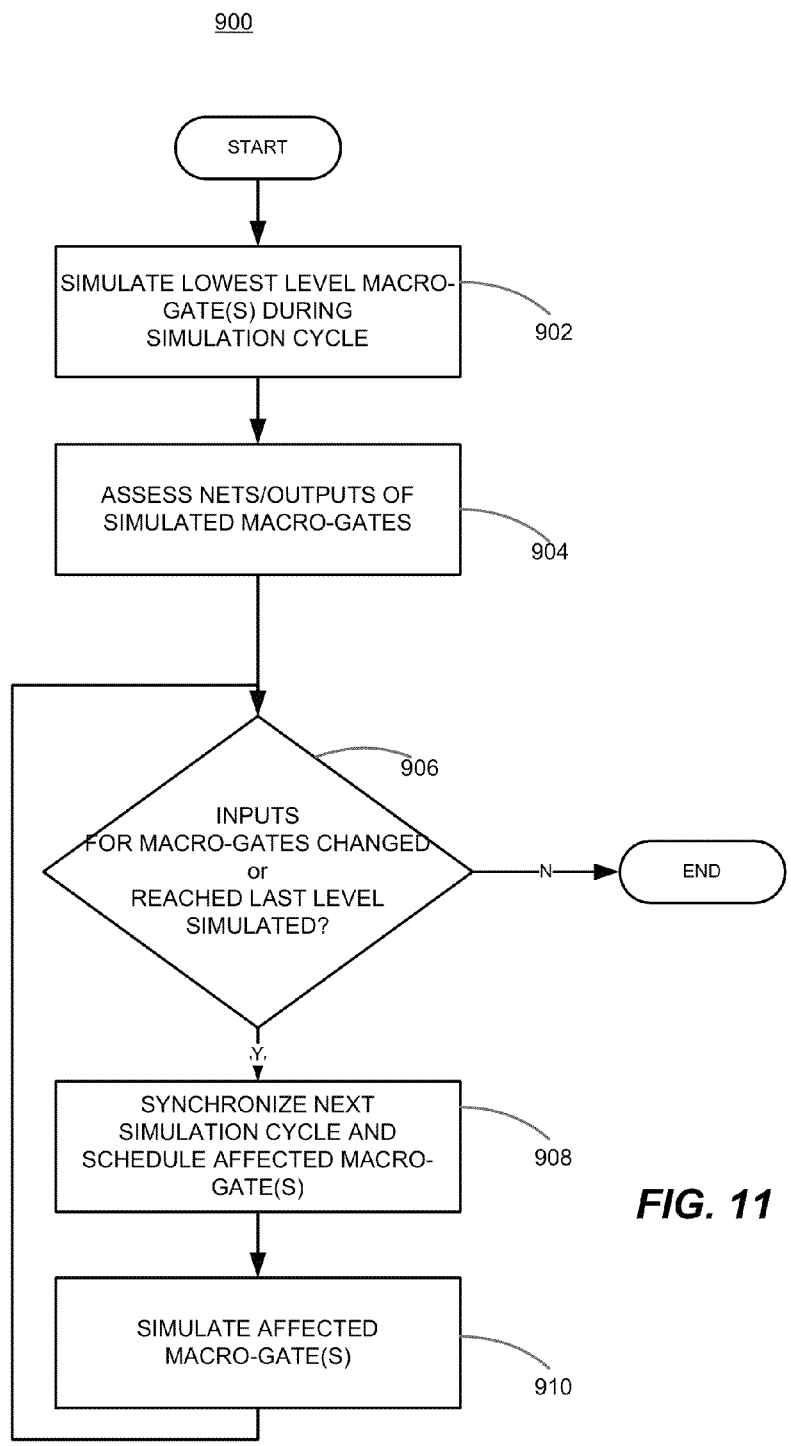
FIG. 11 is a flow diagram of an example event-driven simulation in accordance with an example.

FIG. 11 illustrates an example process flow 900, in which a block 902 simulates the initial, lowest layer of macro-gates during a simulation cycle. A block 904 assesses the nets resulting from these macro-gate simulations, after that block 906 determines if any inputs have changed. If not, no further macro-gates need to be activated and the process ends. Otherwise, block 908 identifies the macro-gate(s) corresponding to the change in monitored nets and synchronizes the next simulation cycle to schedule these affected macro-gates. Block 910 then simulates any affected macro-gate and returns the process 900 to the block 906.

In an implementation of the logic simulation, in which an array of monitored nets are mapped to unique locations, if a macro-gate simulation modifies the value of any of these nets, the corresponding, mapped locations are tagged. Additionally, each macro-gate may have a corresponding sensitivity list, where all the input nets triggering its activation are tagged. In such examples, to determine if any input change has occurred, a bit-wise AND operation between the monitored nets array and a macro-gate's sensitivity list may be performed (e.g., by the block 906). If a macro-gate input has changed, the macro-gate is activated for simulation during the next simulation cycle. If no input has changed, then the macro-gate will not be activated for simulation during the next cycle.

With reference to FIG. 2, an example description of data storage is now provided. It will be appreciated that the techniques may be implemented in other data storage configurations. Each individual macro-gate may be simulated by a thread block corresponding to the processors 204; and each thread within that block 204 simulates one logic gate, one level at a time. The threads inside the thread blocks 204 synchronize after each level so as to finish writing all the outputs of the gates of a previous level before the gates of next level are simulated. Truth tables for the gates in the technology library are mapped to the shared memory 206 because of their frequent access.

The intermediate net values (outputs of internal gates) may be stored in the shared memory 206 because they are accessed by several gates, and are the most frequently accessed values. The macro-gate topology may be stored in the device memory 208, from which each single thread fetches their corresponding gate type and connectivity information. The logic gates may be stored in a regular fashion like a matrix, where the location of each gate corresponds to the position of their output net in the balanced macro-gate. The logic gates may also correspond to the layout of the nets in the shared memory 206, thus creating the scope of very regular execution suited for the SIMD UNIT 104. Each thread in the block 204 may fetch the information corresponding to a gate, which contains locations of input nets and which logic function this gate should perform. However, the balanced macro-gate from the block 406 is a regular structure, meaning that all such fetches are contiguous and may be coalesced to have minimum number of device memory loads. The input nets are read from the shared memory 206 and the truth table access determines the desired output, which is then written to the shared memory 206. At the end of simulating a macro-gate, the produced outputs of the macro-gate, which are actually monitored nets, are transferred to their device memory location for value change detection.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any suitable non-transitory computer readable medium such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), CPU, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed:

1. A method for logic simulation of a connectivity level description of an integrated circuit, where the connectivity level description comprises a plurality of logic elements, the method comprising:
    in a first processor, clustering logic elements into cluster groups each comprising at least one of the plurality of logic elements, where the cluster groups are sized such that, during a simulation cycle, each cluster group is capable of being simulated on a different processor block of a second processor, wherein processing units of the second processor is configured for simultaneous operation, and wherein each cluster group is defined by a height corresponding to a number of logic levels of the cluster group and a width corresponding to a number of logical outputs of the cluster group, where the height and width of the cluster group define the size of the cluster group, and wherein the height and width combination of at least one cluster group differs from the height and width combination of at least one other cluster group; and
    in the second processor, simultaneously simulating a plurality of the cluster groups each being simulated on a different one of the processing units.

2. The method of claim 1, wherein the connectivity level description is a netlist and the logic elements are logic gates within the netlist.

3. The method of claim 2, further comprising separating the cluster groups into one of a plurality of layers, from a lowest level layer to a highest level layer.

4. The method of claim 3, wherein each cluster group has a plurality of logic levels each having one or more logic elements, the method further comprising
    for at least one of the cluster groups, balancing the cluster group to equalize the number of logic elements at each of the plurality of logic levels for the cluster group.

5. The method of claim 4, further comprising performing the balancing for each cluster group in a layer.

6. The method of claim 3, wherein all cluster groups in a layer are capable of simultaneous simulation by the second processor.

7. The method of claim 2, wherein the height of each cluster group is a gap height, which is the number of logic levels in a longest logic chain within the cluster group, and wherein the width is a lid width, which is the number of logical output values provided by the cluster group after the simulation cycle.

8. The method of claim 7, the method further comprising adjusting the respective gap height and lid width for each cluster group such that the cluster group is configured for simulation on one of the processing units.

9. The method of claim 7, wherein the gap height and lid width are determined based on the number of cluster groups to be formed, the number of output values to be monitored after each simulation cycle, or an activation rate of logic elements within the cluster groups.

10. The method of claim 2, wherein at least two of the cluster groups share a common logic element.

11. The method of claim 2, wherein clustering the logic elements into cluster groups comprises:
    identifying a partitioning scheme; and
    segmenting the logic elements based on the partitioning scheme into the cluster groups, such that each cluster group is to simulate independent of each other cluster group during a simulation cycle.

12. The method of claim 11, wherein the partitioning scheme is a cone partitioning scheme, wherein segmenting the logic elements comprises assigning at least one logic cone to each cluster group.

13. The method of claim 12, wherein segmenting the logic elements comprises assigning to at least one cluster group only logic cones having an activity level above a threshold value.

14. The method of claim 12, wherein segmenting the logic elements comprises assigning to at least one cluster group only logic cones having an activity level below a threshold value.

15. The method of claim 1, further comprising clustering the logic elements into the cluster groups using a logic element sharing scheme.

16. The method of claim 1, further comprising clustering the logic elements into the cluster groups using an activation profile scheme.

17. The method of claim 1, wherein simulating the cluster groups comprises simulating all cluster groups in the simulation cycle.

18. The method of claim 1, wherein simulating the cluster groups comprises identifying all cluster groups in a level that have a changed input during a simulation cycle and simulating the identified cluster groups having the changed input.

19. The method of claim 1, wherein the first processor and the second processor are implemented in a single SIMD processor.

20. A logic simulator for simulating a connectivity level description of an integrated circuit, where the connectivity level description comprises a plurality of logic elements, the logic simulator comprising:
    a parallel processor having a plurality processing units capable of simultaneous execution by the parallel processor; and
    a host processor configured to,
        cluster logic elements into cluster groups each cluster group comprising at least one of the plurality of logic elements, where the cluster groups are sized such that each cluster group is configured to be simulated on one of the processing units of the parallel processor, wherein each cluster group is defined by a height corresponding to a number of logic levels of the cluster group and a width corresponding to a number of logical outputs of the cluster group, where the height and width of the cluster group define the size of the cluster group, and wherein the height and width combination of at least one cluster group differs from the height and width combination of at least one other cluster group, and map each cluster group for simulation by one of the plurality of processing units.

21. The logic simulator of claim 20, wherein the parallel processor has a SIMD architecture.

22. The logic simulator of claim 20, wherein the parallel processor has a general purpose graphics processing unit (GP-GPU) architecture.

23. The logic simulator of claim 20, wherein the parallel processor has a compute unified device architecture (CUDA) architecture.

24. The logic simulator of claim 20, wherein the parallel processor comprises a plurality of cores each having a plurality of the processing units.

25. The logic simulator of claim 24, wherein the parallel processor comprises a device memory connected to each of the plurality of cores and a shared memory, wherein the shared memory is configured for simultaneous access by each of the processing units within one of the cores, during a processing cycle.

26. The logic simulator of claim 20, wherein the connectivity level description is a netlist and the logic elements are logic gates within the netlist.

27. The logic simulator of claim 20, wherein the host processor is further configured to separate the cluster groups into one of a plurality of layers, from a lowest level layer to a highest level layer.

28. The logic simulator of claim 27, wherein the host processor is further configured to balance the cluster groups.

29. The logic simulator of claim 27, wherein all a plurality of the cluster groups in a layer is configured for simultaneous simulation by the parallel processor.

30. The logic simulator of claim 27, wherein the height of each cluster group is a gap height, which is the number of logic levels in a longest logic chain within the cluster group, and wherein the width is a lid width, which is the number of logical output values provided by the cluster group after a simulation cycle.

31. The logic simulator of claim 30, wherein the host processor is further configured to set the respective gap height and lid width for each cluster group such that each cluster group is configured for simulation on one of the processing units.

32. The logic simulator of claim 20, wherein the host processor is further configured to cluster the logic elements using a logic element sharing scheme.

33. The logic simulator of claim 20, wherein the host processor is further configured to cluster the logic elements using an activation profile scheme.

34. The logic simulator of claim 20, wherein the parallel processor is configured to simulate all cluster groups of a level in a simulation cycle.

35. The logic simulator of claim 20, wherein the parallel processor is configured to:
identify all cluster groups that have a changed input during a simulation cycle; and
simulate the identified cluster groups having the changed input.

36. The logic simulator of claim 20, wherein the host processor is configured to identify cones of logic elements where each cone has an activity level.

37. The logic simulator of claim 36, wherein the host processor is configured to assign to at least one cluster group only cones having activity levels below a threshold value.

38. The logic simulator of claim 36, wherein the host processor is configured to assign to at least one cluster group only cones having activity levels above a threshold value.

39. The logic simulator of claim 20, wherein the host processor and the parallel processor are implemented in a single SIMD processor.

* * * * *